March 27, 1951     R. E. BRIGGS     2,546,254
ELECTROLYTIC WATER TREATING CELL
Filed Sept. 3, 1946     2 Sheets-Sheet 1
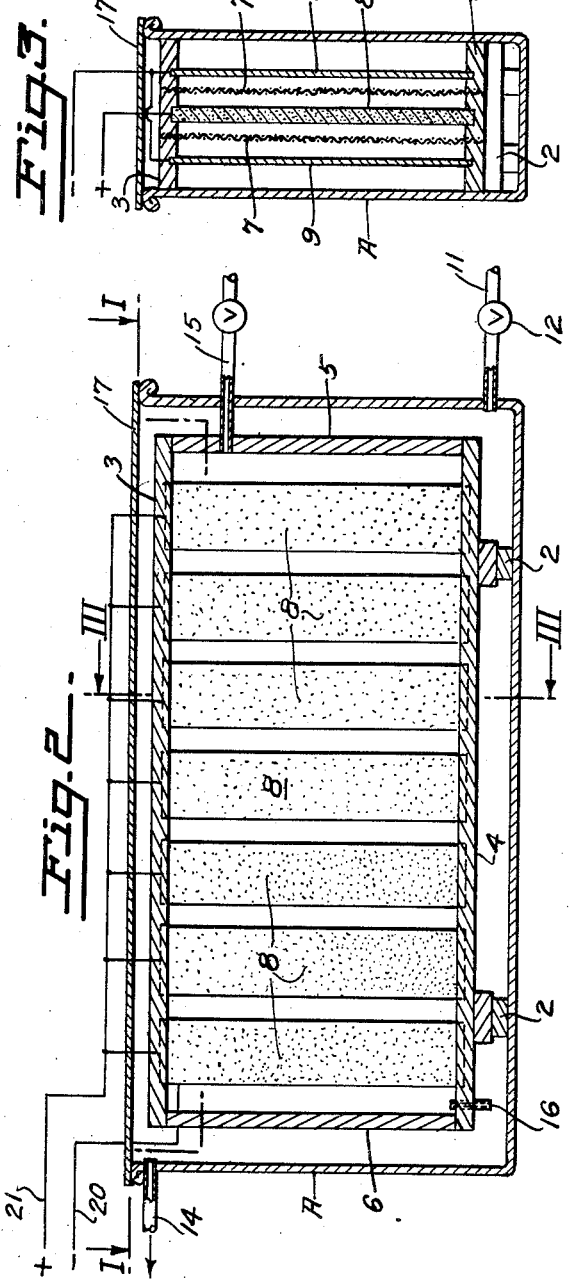
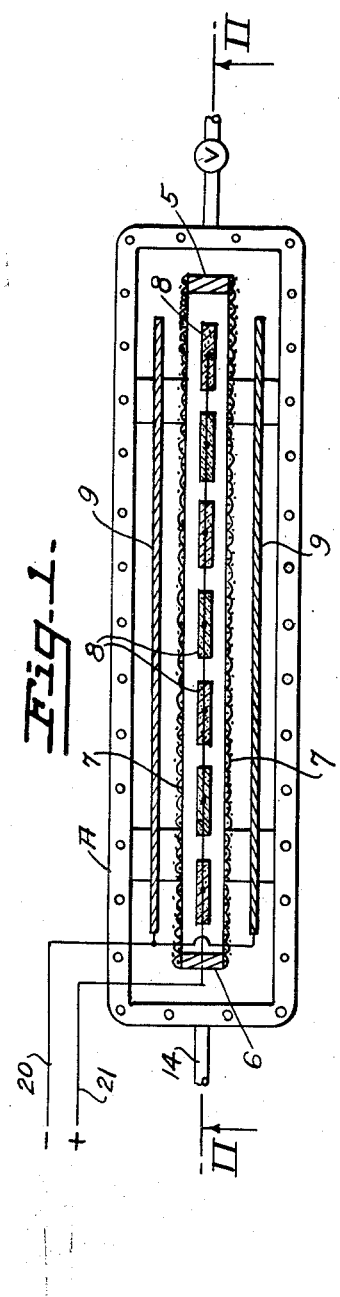
INVENTOR.
ROBERT E. BRIGGS
BY
Thomas Aastberg
ATTORNEY.

March 27, 1951      R. E. BRIGGS      2,546,254
ELECTROLYTIC WATER TREATING CELL
Filed Sept. 3, 1946      2 Sheets-Sheet 2
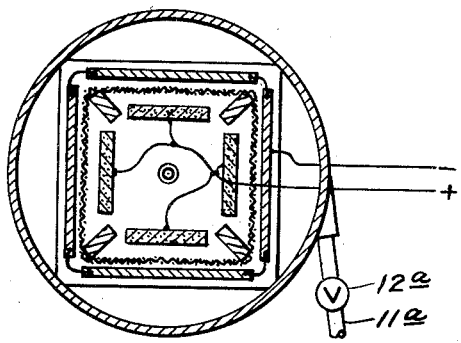
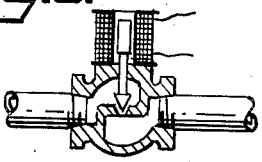
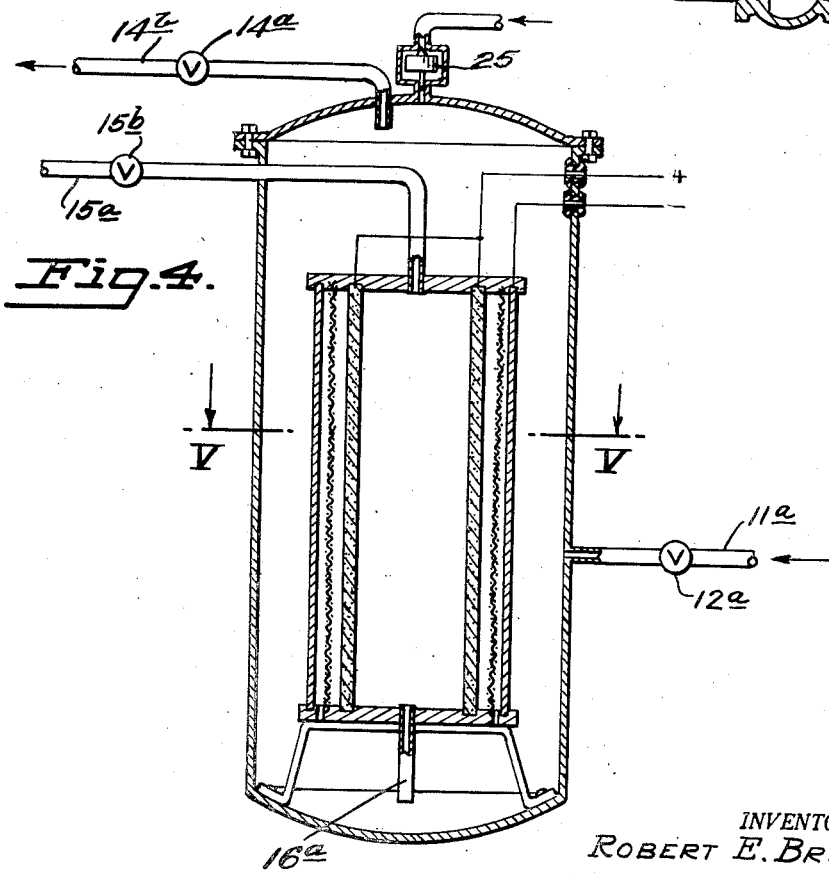
INVENTOR.
ROBERT E. BRIGGS
BY
Thomas Castberg
ATTORNEY.

Patented Mar. 27, 1951

2,546,254

UNITED STATES PATENT OFFICE 2,546,254

ELECTROLYTIC WATER TREATING CELL

Robert E. Briggs, Los Angeles, Calif.

Application September 3, 1946, Serial No. 694,489

3 Claims. (Cl. 204—263)

This invention relates to improvements in electrolytic cell design, that is cells intended for electrolytic water softening and the like, and especially to a method and apparatus whereby an alkalizing agent is introduced to an anode compartment of the cell.

In my co-pending application entitled "Method of Electrolytic Water Softening and pH Adjustment," Serial Number 591,195, filed April 30, 1945, (now Patent 2,535,035) the advantage of circulating and adding an alkalizing agent to the anode solution which eventually becomes waste was fully described. The process required a pump or lift to return the anode discharge to the anode compartment after it had been treated with an alkalizing agent such as milk of lime or the sludge precipitated by the cathodic influence of the electrolytic cell. Such a process is practical when applied to relatively large volume production of treated or softened water, but it has been found wanting in application to small scale treatment where mechanical devices for transfer of a small volume of solution becomes, to say the least, a nuisance.

The object of the present invention is to provide a method and apparatus whereby an alkalizing agent may be introduced to the anode compartment of a cell, particularly when the quantity of water treated is comparatively small.

The method and apparatus employed is shown by way of illustration in the accompanying drawings, in which:

Fig. 1 is a horizontal section taken on line I—I of Fig. 2;

Fig. 2 is a central longitudinal vertical section taken on line II—II of Fig. 1;

Fig. 3 is a vertical cross section taken on line III—III of Fig. 2, said Figs. 1, 2 and 3 showing a gravity flow type of cell;

Fig. 4 is a central vertical section showing a pressure type of cell;

Fig. 5 is a cross section taken on line V—V of Fig. 4; and

Fig. 6 is a detailed view showing a solenoid actuated valve.

Referring to the drawings in detail, and particularly Figs. 1, 2 and 3, A indicates the exterior case or shell of a cell. Mounted in the bottom thereof are spacer blocks 2—2, and supported thereby is a frame consisting of top and bottom members 3 and 4 and end members 5 and 6. The frame in general is rectangular in shape and is disposed centrally between the exterior side walls of the cell. Secured to each side of the frame are diaphragms 7 made of heavy canvas or other porous material and formed between the diaphragms is an anode chamber in which is disposed a plurality of anodes 8. Between the outer shell A and the diaphragms is formed a cathode chamber, and disposed in said chamber and suitably secured to the frame, one on each side thereof, are cathodes 9—9.

The outer case of the shell A may be made of light gage iron, steel or other suitable water tank material. The cathodes may be made of iron, brass or steel in the form of screens or perforated plates. The anodes are formed from carbon or graphite for water softening and most general purposes and the frame supporting the same may be made of wood or other suitable material.

The water to be softened is admitted to the cell through a pipe 11 and its flow is controlled by a valve 12 while the softened or treated water is discharged from the opposite end of the cell through a pipe 14. A valve controlled bleeder pipe 15 is connected with the upper end of the anode chamber and an inlet pipe 16 is provided at the opposite and lower end of the chamber. Inasmuch as the cell shown is designed for gravity flow there is no necessity of closing or sealing the cell. Hence, a cover 17 placed over the upper end of the cell will suffice to exclude dust or dirt and will at the same time permit free escape of any gases generated.

In actual operation the raw water to be softened is introduced to the cathode compartment of the cell through the valve controlled pipe 11 located at one end of the cell and preferably near the bottom. As water flows forward past the cathode electrodes 9, electrochemical changes take place which result in precipitation of major hardness ingredients contained in the water in proportion to the quantity of direct electric current applied from an external source. The lines connected with said source are indicated at 20 and 21. The precipitate formed during traverse of the water to the outlet 14 tends to settle into the relatively quiet zone at the bottom of the cell in the vicinity of the pipe 16. This precipitate, when the valve on the bleeder pipe 15 is opened, will be carried along with the water entering the anode compartment through the pipe 16. Since the solution in the anode compartment tends to become acid under the anodic influence, a substantial portion of the precipitate will dissolve in that solution and will be carried away in its dissolved form through the bleeder pipe 15. The water discharging from this pipe is waste water and a flow is maintained through said pipe by locating it sufficiently below the normal level of the water in the cell so that hydrostatic pressure maintains a continuous flow. The flow, of course, is regulated by the valve on the bleeder pipe and for the most efficient operation it is desirable to maintain the acid concentration value in the anode compartment between 2 and 3 pH. Factors influencing the amount of anode waste water are: amperage imposed on the treating cell and its effect on acid ion migration into the anode compartment; natural acid constituents in the raw water; and the quantity of sludge deposited in the zone affected by the drawing power of the water flowing through the anode chamber inlet.

Fig. 4 shows a cylindrical pressure type of cell employing virtually the same principles described in connection with atmospheric pressure or gravity flow type cell. The controls employed are, however, different and their operation will be as follows. The raw water is introduced through pipe 11a. This pipe is also provided with a valve as shown at 12a but it usually remains open as flow through the cell is controlled by a valve 14a mounted on the outlet pipe 14b. The inlet pipe is preferably located near the bottom and enters on a tangent so as to produce a swirling motion, thereby setting up centripetal action which tends to concentrate and position all settling precipitates on the center portion of the bottom of the tank or cylinder. Direct electric current is applied to the anodes and cathodes as previously described. This current produces precipitates and softening effect in a cathode chamber, that is the annular space formed between the cathodes and the cylinder walls. Although most active electrochemical reaction takes place in the immediate proximity of the cathode electrodes, it will extend throughout the cathode chamber when a reaction time is allowed. The precipitate formed particularly when the cell is operated on intermittent deliveries will tend to settle in the zone below the anode compartment or the inlet provided therefor and indicated at 16a. This precipitate will be drawn along with the anode feed water into the anode compartment. The water thus entering discharges either continuously or intermittently through a bleeder pipe 15a controlled by a valve 15b. Anodic influence set-up by the positive potential imposed from the anode electrodes produces substantial solution of the precipitate introduced into the anode chamber, and if the flow is properly regulated, a predetermined pH value may be maintained in the anode chamber.

Since the cell shown in Fig. 4 operates under pressure, a plumbing cock could be employed on the bleeder pipe, but since the aperture therethrough for a small flow of water would be very small, even minute particles might tend to clog it. For this reason an intermittent discharge is desirable and such a discharge may be obtained by employing a solenoid type of valve such as shown in Fig. 6. The circuit through that valve can be controlled by a time clock driving a cam which would intermittently open and close the circuit. In the operation of the cell gas is produced by cathodic influence and some is released from the raw water. Such gas must be released and a float type of vent valve such as shown at 25 is accordingly employed.

The bleeder pipe employed in connection with the anode chamber is provided primarily to induce automatic flow, but in addition thereto it accomplishes another purpose in electrolytic cell usage. It is a well-known fact that electrolytic cells of this type set up a counter electromotive force, substantially attributable to acidity in the anode chamber and alkalinity in the cathode chamber. When a cell of this character is cut out of service for some time, an externally applied voltage must be maintained equal to or slightly in excess of this counter electromotive force to prevent reversal of the reaction sought. By providing a bleeder pipe for the anode chamber and positioning it below the normal level of the solution in the cell, it is obvious that water will continue to flow after the inlet has been closed until the water level reaches the bleeder pipe. This flow of alkaline solution, carrying with it a precipitate or acid counter-acting agent, tends to bring the solutions into voltaic equilibrium, and when service for the cell is resumed, the water in the cathode chamber will still be sufficiently soft. For the pressure type of cell the flow through the discharge line may be continued until service is resumed or the waste control set for a delayed cut off when the raw water inlet valve is left open. If this inlet valve is closed for a shut down period, the cell becomes in effect an atmospheric pressure unit and waste disposal will follow the method previously described. In either case the cell is not completely drained when closed down for any period and is therefore readily returned to service.

From the foregoing it should be obvious that the type of cell shown, whether gravity or pressure type, provides an automatic means of disposing of the precipitate and at the same time utilizing the precipitate to maintain a predetermined pH value in the anode chamber. Either a hydrostatic head or a pressure differential provides the propelling force for precipitate and solution transfer. Continued flow through the anode chamber bleeder pipe after a cell has been cut out of service provides a means of conditioning the cell for idle periods. This conditioning of the cell makes it possible to cut off externally applied electrical energy for some installations, but does not restrict or limit its maintenance for others. Initial cost for a cell of this character will be much less than a type disclosed in my copending application heretofore referred to as pumps, lifts or mechanical feeders for introducing the alkalizing agent into the anode chamber may be eliminated. Since the use of an alkalizing agent is important from the standpoint of electrical economy and the quality of the soft water produced, the present cell becomes a valuable contribution to the art as low maintenance and reduced operating service for such a cell makes possible the application of this electrolytic process to small volume usage that would otherwise be impractical. In some instances the water to be treated is comparatively soft and the amount of hardness material precipitated is small and not sufficient in amount to accomplish the required neutralization. In that case the flow of water through the anode compartment will be increased as the alkaline water itself has a neutralizing action and compensates for the lack of precipitates.

Having thus described my invention, what I claim and desire to secure by Letters Patent is—

1. Water softening apparatus, which comprises, an electrolytic cell having a porous diaphragm separating said cell into a cathode compartment and an anode compartment, an insoluble anode positioned in said anode compartment, a cathode positioned in said cathode compartment, a supply conduit connected to one portion of said cathode compartment for introducing hard water to be softened into said cathode compartment into contact with said cathode to form the catholyte in said cell, said cell having a constantly open conduit between said anode compartment and another portion of said cathode compartment to provide for free flow of catholyte into said anode compartment to form the anolyte therein, said constantly open conduit being the sole inlet conduit for flow of liquid into said anode compartment, means for passing a direct current between said anode and cathode through said anolyte and catholyte, whereby said anolyte tends to become acid and said catholyte tends to become alkaline and precipitate insoluble alkaline compounds of hardness producing materials from said hard water to thereby soften said hard water, a first discharge conduit connected to another portion of said cathode compartment for withdrawing softened water from said cathode compartment and discharging said softened water from said apparatus, said first discharge conduit being independent of any anode compartment, a second discharge conduit connected to said anode compartment for discharging anolyte from said apparatus independently of said softened water, whereby the discharged anolyte is replaced in said anode compartment by alkaline water flowing through said constantly open conduit from said cathode compartment, and a valve in said second discharge conduit for controlling said discharge of anolyte and the amount of alkaline water flowing into said anode compartment to thereby control the acidity of the discharged anolyte, said anode and cathode compartments being open to the atmosphere, whereby free flow of liquid through said constantly open conduit maintains substantially the same liquid level in both the anode and cathode compartments, said first discharge conduit being an overflow conduit for softened water, said second discharge conduit being an overflow conduit for said anolyte and being positioned substantially below said first discharge conduit, said anode compartment having a capacity sufficiently smaller than the capacity of said cathode compartment that continued discharge of anolyte through said valve upon interruption of said direct current and of the introduction of hard water through said supply conduit causes substantially all of the acid anolyte in said anode compartment to be replaced by alkaline water from said cathode compartment.

2. Water softening apparatus, which comprises, an electrolytic cell having a porous diaphragm separating said cell into a cathode compartment and an anode compartment, an insoluble anode positioned in said anode compartment, a cathode positioned in said cathode compartment, a supply conduit connected to one portion of said cathode compartment for introducing hard water to be softened into said cathode compartment into contact with said cathode to form the catholyte in said cell, said cell having a constantly open conduit between said anode compartment and another portion of said cathode compartment to provide for free flow of catholyte into said anode compartment to form the anolyte therein, said constantly open conduit being the sole inlet conduit for flow of liquid into said anode compartment, means for passing a direct current between said anode and cathode through said anolyte and catholyte, whereby said anolyte tends to become acid and said catholyte tends to become alkaline and precipitate insoluble alkaline compounds of hardness producing materials from said hard water to thereby soften said hard water, a first discharge conduit connected to another portion of said cathode compartment for withdrawing softened water from said cathode compartment and discharging said softened water from said apparatus, said first discharge conduit being independent of any anode compartment, a second discharge conduit connected to said anode compartment for discharging anolyte from said apparatus independently of said softened water, whereby the discharged anolyte is replaced in said anode compartment by alkaline water flowing through said constantly open conduit from said cathode compartment, and a valve in said second discharge conduit for controlling said discharge of anolyte and the amount of alkaline water flowing into said anode compartment to thereby control the acidity of the discharged anolyte, said cathode compartment being a closed pressure chamber and said anode compartment being positioned within said cathode compartment, said apparatus having intermittent means for opening and closing said valve, whereby the acid anolyte in said anode compartment is replaced with water flowing from said cathode compartment through said constantly open conduit in the event said direct current is interrupted.

3. Water softening apparatus which comprises, an electrolytic cell having a porous diaphragm dividing said cell into an anode compartment and a cathode compartment, an insoluble anode positioned in said anode compartment, a cathode positioned in said cathode compartment, a supply conduit connected to one portion of said cathode compartment for introducing hard water to be softened into said cathode compartment into contact with said cathode to form the catholyte in said cell, said cell having a constantly open conduit connected between said anode compartment and another portion of said cathode compartment to provide for free flow of catholyte into said anode compartment to form the anolyte therein, means for passing a direct current between said anode and cathode whereby said anolyte becomes acidic and said catholyte becomes sufficiently alkaline to precipitate alkaline compounds of hardness-producing materials and produce softened water, said open conduit being connected to said cathode compartment at a point spaced from said supply conduit for supplying alkaline catholyte to said anode compartment and constituting the sole means of supply of anolyte to said anode compartment, a catholyte discharge conduit connected to said cathode compartment at a point spaced from said supply conduit for discharging said softened water from said cathode compartment, said cathode discharge conduit being independent of any anode compartment of said cell, an anolyte discharge conduit independent of any of the above mentioned conduits and connected to said anode compartment at a point spaced from said open conduit for discharging acidic anolyte from said anode compartment, means for controlling the discharge of anolyte through said anolyte discharge conduit to control the flow of catholyte into said anode compartment, said cathode compartment being of greater volumetric capacity than said anode compartment and said anolyte discharge conduit being connected to said anode compartment above said open conduit and below the operating level of water in said cell to continue the discharge of anolyte when operation of said cell is discontinued so as to cause sufficient catholyte from said cathode compartment to flow through said open conduit to reduce the acidity of said anolyte during shut-down periods of said cell.

ROBERT E. BRIGGS.

REFERENCES CITED

The following references are of record in the file of this patent:

UNITED STATES PATENTS

| Number | Name | Date |
| --- | --- | --- |
| 1,548,362 | Holmboe | Aug. 4, 1925 |
| 1,840,105 | Kean | Jan. 5, 1932 |
| 2,271,341 | Johnson et al. | Jan. 27, 1942 |
| 2,341,356 | Briggs | Feb. 8, 1944 |